(12) United States Patent
Liu

(10) Patent No.: US 8,453,963 B2
(45) Date of Patent: Jun. 4, 2013

(54) AMPHIBIOUS LARGE AIRCRAFT WITHOUT AIRSTAIRS

(76) Inventor: Shiying Liu, Wuhan (CN)

( * ) Notice: Subject to any disclaimer, the term of this patent is extended or adjusted under 35 U.S.C. 154(b) by 198 days.

(21) Appl. No.: 13/146,966

(22) PCT Filed: Mar. 1, 2010

(86) PCT No.: PCT/CN2010/070806
§ 371 (c)(1),
(2), (4) Date: Jul. 29, 2011

(87) PCT Pub. No.: WO2010/099730
PCT Pub. Date: Sep. 10, 2010

(65) Prior Publication Data
US 2011/0284683 A1    Nov. 24, 2011

(30) Foreign Application Priority Data

Mar. 4, 2009 (CN) .......................... 2009 1 0060955

(51) Int. Cl.
*B64C 29/00* (2006.01)
(52) U.S. Cl.
USPC ............... 244/23 B; 244/1 R; 244/36; 244/55
(58) Field of Classification Search
USPC .................. 244/1 R, 12.3, 23 B, 36, 45 R, 55, 244/102 SS
See application file for complete search history.

(56) References Cited

U.S. PATENT DOCUMENTS

| 3,550,547 A | 12/1970 | Friedrich et al |
| 4,579,300 A | 4/1986 | Carr |
| 5,086,992 A | 2/1992 | Gosen |
| 5,893,535 A | 4/1999 | Hawley |

FOREIGN PATENT DOCUMENTS

| CN | 1186757 A | 7/1998 |
| CN | 1351944 A | 6/2002 |
| CN | 2504194 Y | 8/2002 |
| CN | 1439573 A | 9/2003 |
| CN | 2642674 Y | 9/2004 |
| CN | 1686758 A | 10/2005 |
| GB | 506719 A | 5/1939 |

OTHER PUBLICATIONS

Wu Jie, the first office action, Mar. 2011, CN.
Wu Jie, the second office action, Aug. 2011, CN.
Wu Jie, the third office action, Nov. 2011, CN.

*Primary Examiner* — Timothy D Collins
*Assistant Examiner* — Nicholas McFall
(74) *Attorney, Agent, or Firm* — IPro, Inc.; Na Xu

(57) ABSTRACT

An amphibious large aircraft without traditional airstairs is disclosed. With its flat and oblong fuselage, said amphibious large aircraft has wing-in-ground effect in addition to generating elevating force in flight. Thus, said amphibious large aircraft has smooth takeoff and touchdown on the runway as well as on broad water area. The flight efficiency is increased by 30-40%. The fuselage has only one floor, wherein the passenger cabin is set in the front of the fuselage, and the cargo hold is mounted above the rear. The wings are extended towards two sides from upper side of the fuselage. A jet engine is mounted above the rear of the fuselage and adjacent to the tail wing. Passengers can go on and off the amphibious large aircraft directly without the need of airstairs and can escape from the aircraft directly without the need of an inflator slide during an emergency.

4 Claims, 14 Drawing Sheets

AMPHIBIOUS LARGE AIRCRAFT WITHOUT AIRSTAIRS

TECHNICAL FIELD

The aircraft of this invention involves an amphibious large aircraft without the traditional airstairs. Especially with its flat and oblong fuselage, said amphibious large aircraft has wing-in-ground effect in addition to generating elevating force in flight. Thus, said amphibious large aircraft has smooth takeoff and touchdown on the runway as well as on broad water area.

BACKGROUND

At present, it is known to all that the fuselage of the large aircrafts with more than 150 passengers are always in narrow cylindrical shape. Aerodynamically, this type of fuselage does not generate elevating force in flight; it only serves as a vessel for the cargo and passengers. With the aircraft load beared by the elevating force generated by the airfoils on both sides, these leads to large airfoil area, long overhanging length and low flight efficiency. Furthermore, because the cross-section of the fuselage is round, and the passenger cabin is over the cargo hold; the cargo hold is inconvenient for use due to its wide top and narrow bottom; the cabin floor has raised ground clearance due to the cargo hold and the undercarriage underneath; taken together, an airstair is the only choice for passenger boarding and landing, and an inflatable slide is the only resort for passenger evacuation in an emergency. For the oversized passenger aircraft such as A-380, the fuselage section consists of three floors; the lower floor is the cargo hold; above which is the passenger cabin with ground clearance of 6.2 meter and 9.0 meter respectively; the passengers are at a height equivalent to the $3^{rd}$ and $4^{th}$ floors, where boarding and landing are inconvenient, and where it is hard to evacuate by inflatable slide in en emergency. Due to the narrow fuselage of the existing aircraft, the passenger cabin is like a corridor, which is inconvenient for use due to the long walking distance for the stewardess; in addition, the main undercarriage is also unable to mount on the airfoil base. In this case, the full load of the aircraft is applied on the airfoil base before being transferred to the land via the main undercarriage when landing. The complicated path for the force transfer leads to the high bending moment on the airfoil base; the underside of the airfoil base must also projects outwards for encasing the column of the main undercarriage, and as a result the airfoil lift is reduced. In addition, since the airfoil and the fuselage form a cross in narrow shape, the aircraft has a long fuselage and a wide wingspan, and also a high fuselage and a large landing area (e.g. passenger aircraft A-380 has a fuselage length of 72.7 m, a wingspan of 98.8 m and an empennage height of 24.3 m), resulting in a tremendous investment in construction from the aircraft manufactory, the service workshop, garage and land acquisition. Due to the complicated structure of the undercarriage bay of the existing aircraft, the overhanging fuselage section has a large bulge undercarriage bay, leading to the increased atmospheric drag in flight. For the existing aircraft, wing-in-ground effect in takeoff and touchdown is relatively low, and the approaching speed is high, thus the runway is long in distance. Besides, due to the cylindrical fuselage, landing on water is generally unsafe; only takeoff and landing on the runway are reliable; and a forced landing on water in en emergency may cost tremendous loss. For instance, both engines of one A-320 airliner of American Airlines were broken down by bird strike shortly after taking off on Jan. 15, 2009; fortunately, it was forced landed on Hudson River at last by the decisive and experienced pilot, preventing a grievous air crash and casualty. The event is recognized as a miracle in the world; although there is no casualty with the 155 passengers, 87 of them were injured, and the aircraft was damaged seriously, with both engines falling into water in addition to the soaked fuselage.

SUMMARY

To overcome the foregoing disadvantages of the existing jumbo aircraft, the aircraft of this invention makes it possible to manufacture a type of improved oversized aircraft; said aircraft generates elevating force for the improved flight efficiency, is free from passenger airstairs, and makes safe and smooth takeoff and touchdown on an existing runway as well as broad sea, lake and river surfaces, leading to a wide scope of applications and enhanced flight safety.

The technical design for the technical solution of the aircraft of this invention is described as follows.

Divide the narrow fuselage of the existing aircraft into two sections from the center, then assemble the said two sections in parallel, and eliminate the cargo hold under the cabin of the existing aircraft section; then reshape the fuselage so that its cross-sectional shape resembles that of the airfoil section, and as such the previous narrow fuselage is transformed into the flat and oblong shaped fuselage; the pilot compartment protrudes out from the fuselage to obtain a better view on the front and the two sides; the airfoil is mounted on the fuselage of the aerofoil section, both sides of central airfoil assembly which is higher above the useable space in the cabin; and the twin-finned supporting empennage is mounted behind the wide fuselage. Therefore, the passenger cabin is no longer like a corridor, rather it resembles an auditorium; and the fuselage generates elevating force in flight for increased flight efficiency and shorter walking distance for the stewardess. For the existing aircraft, the passenger cabin and the cargo hold are at different floors and the area ratio of the two is fixed. In contrast, the passenger cabin and the cargo hold are at the same floor in the aircraft of this invention. Even the equivalent of the largest oversized A380 airliner in the world (five-hierarchy structure of 555 seats, one-hierarchy structure of 840 economy class seats) can have its seats all arranged to be within one floor; and the area ratio of the passenger cabin and the cargo hold is adjustable based upon the market demand of the client. As for the low atmospheric pressure in the aircraft above 10,000 meters in the sky, the cabin needs to be pressurized to 0.8 atmospheric pressure to ensure easy breath by the passengers and the crew; and the strength and rigidity of the aircraft structure is achievable by the additional columns and oblique struts in the flat fuselage, for the loading structure of a octagonal framework is similar to that of the round framework of the traditional aircrafts.

As the fuselage of the aircraft of this invention is flat, and the fuselage width approximately doubles that of the existing aircraft of equal numbers of seats, and the aircraft of this invention has higher space on top within the cabin, thus it is not necessary to mount the main landing gear (MLG) on the airfoil base; rather, the MLG bay and the front undercarriage bay are mounted directly in the fuselage, so that the full load of the aircraft is transferred on the ground via the undercarriage; the path for the force transfer is simple, which is helpful for not only reducing the weight of the aircraft structure, but also avoiding disruption of the normal form of the fuselage and the airfoil base sections, thereby leading to improved aircraft lift and lift-drag ratio.

The engines are mounted either on the rear top of the flat and oblong shaped fuselage or suspended in the lower part of the flat empennage. As the flat fuselage has no cargo hold underneath and the undercarriage is inside, if the current rotary undercarriage control is replaced by the vertical retractable control, and the undercarriage door of the traditional up-and-down turnover type is replaced by the sliding doors, the fuselage baseplate of the aircraft of this invention can be landed firmly close to ground; therefore, passengers can get on and off the aircraft of this invention in the same convenient way as that of a bus, and no inflatable slide is necessary in an emergency evacuation.

Its flat fuselage of the aircraft of this invention instead of the cylindrical shape of the existing aircraft makes the aircraft of this invention have better gliding performance than the existing aircraft, which is helpful for reducing the approach speed, for safe takeoff and touchdown on the runway, and for shortening the required runway distance in comparison to the existing aircraft. Likewise, the invention has better wing-in-ground effect than the existing floatplane when flying close to water surface; hence it is comparable to the floatplane in terms of convenient, safe and smooth takeoff and touchdown on broad water. Assuming that the aircraft of the aircraft of this invention would suffer a bird strike similar to that of the American Airlines airliner, the inertia velocity of the aircraft of this invention would generate enough elevating force and airfoil lift to support the gliding of the idle aircraft, providing the time needed for seeking broad surface of sea, river or lake for landing the aircraft at small landing angle near the surface for a safe and smooth touchdown; in this way, all the passengers and crew would be free from injury, and the aircraft as a whole would be safe. The existing floatplane has the cylindrical fuselage, while the aircraft of this invention has the flat fuselage with better wing-in-ground effect, thus the invention will perform better than the existing floatplane.

From the perspective of manufacture and assembly, the A380 oversized airliner needs simultaneous vertical manufacture and assembly at three floors. However, the passenger cabin and the cargo hold of the aircraft of this invention are on the same floor, and the aircraft section has only one floor where the manufacture and assembly takes place; together with the vertical retractable undercarriage, the final assembly is done on the ground floor, which is much more convenient for assembly and adjustment, leading to a remarkably less manufacturing cost and shorter manufacturing cycle.

To conclude, under conditions of equivalent load (equal passengers or cargo) and aviation mileage, the aircraft of this invention is more advantageously effective and its flight efficiency is estimated to be increased by 30~40% in comparison with other existing aircrafts; when the aircraft of this invention flies 4~12 meters above water, the flight efficiency may be improved by 40~45%; the aircraft of this invention has remarkably reduced manufacturing cost and shortened manufacturing cycle; its fuselage land close to ground for convenient passage of the passengers and cargo, faster and safer emergency evacuation, wide scope of applications in terms of safe and smooth takeoff and touchdown on the runway and water as well, allowing the future construction of an airport in a coastal city for less land acquisition.

BRIEF DESCRIPTION OF FIGURES

The aircraft of this invention is further illustrated by the attached illustrations and embodiments.

Figure 1:
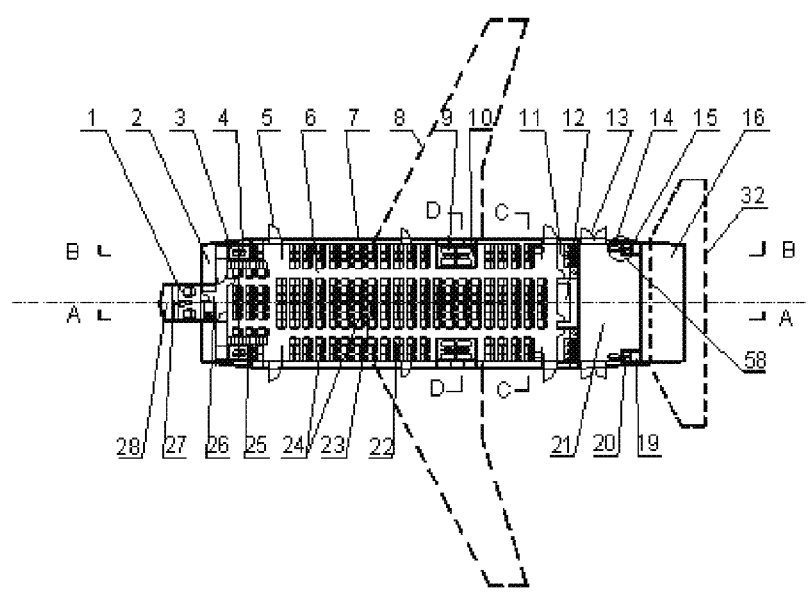
FIG. 1 is the layout plan of the passenger cabin (two-compartment cabin).

In the drawings, 1—Cockpit; 2—Electronic console chamber; 3—front undercarriage bay; 4—front undercarriage; 5—passenger cabin door; 6—passenger cabin; 7—fuselage; 8—airfoil; 9—MLG; 10—MLG bay; 11—rest room; 12—food serving compartment; 13—cargo hold door; 14—fuel-oil engine; 15—propellers; 16—fuselage empennage; 17—steering sleeve; 18—rotating shaft; 19—propeller chamber; 20—fixed gearbox; 21—cargo hold; 22—seat; 23—column; 24—oblique strut; 25—airstairs; 26—engine room; 27—instrument panel; 28—pilot radar compartment; 29—luggage compartment; 30—jet engine; 31—vertical empennage; 32—horizontal empennage; 33—front and rear sliding doors; 34—airfoil assembling center; 35—open-V empennage; 36—passenger cabin window; 37—aircraft top passenger cabin window; 38—aircraft top exit; 39—transverse framework of the passenger cabin; 40—aileron; 41—fuselage framework; 42—hexagonal shaft; 43—pore; 44—hydraulic cylinder; 45—bevel gear; 46—locking bolt; 47—loose bevel gear; 48—shaft; 49—movable gearbox; 50—piston; 51—waterproof shaft gland; 52—harbor airport; 53—dome bracing; 54—wharf; 55—rain shed; 56—surface; 57—mounting base; 58—vertical lift propeller device; 59—lifting hole; 60—open-V empennage; 61—cargo hold open close slot; 62—coupling; 63—U-groove; 64—underplate; 65—snap slot; 66—strip air cushion.

DETAILED DESCRIPTION

As illustrated in the embodiment in FIG. 1 (equivalent to A-32 airliner series), the linear length-to-width ratio of the fuselage (7) is preferred to be in the range of 2.0~4.5:1; the pilot compartment (1) protrudes out from the fuselage (7) for better pilot view; the engine room (26), the electronic console chamber (2) and the front undercarriage bay (3) are configured in the front section of the fuselage (7); in the middle of the fuselage (7) is the passenger cabin (6), within the aisle and the seats are arranged (22); behind the passenger cabin (6) is the section for the rest room (11) and the food serving compartment (12). The MLG bay (10) is arranged at the two sides at the rear of the aircraft center of gravity in the passenger cabin (6), and within the MLG bay is the MLG (9); the cabin doors (5) are arranged on both sides of the passenger cabin (6). The cargo hold (21) and the fuselage empennage (16) that can rotate around the rotating shaft (18) is arranged at the rear of the fuselage (7); the vertical lift propeller device (58) is arranged at both ends of the cargo hold (21), and the device is mainly for manipulating in-shore, off-shore and steering of the aircraft when the aircraft is landed on water (with more details found in FIGS. 27 to 34). Because the longitudinal section of the fuselage (7) matches the section shape of the airfoil, and the fuselage (7) is wider and larger than the airfoil, when the aircraft of this invention flies forward as propelled by the engine (30), the fuselage (7) may generate elevating force greater than that generated by the airfoil. In contrast, the existing aircraft is unable to generate elevating force due to its cylindrical shaped fuselage. To analyze comprehensively, the aircraft of this invention may improve the flight efficiency by about 30~40% than the existing civil airliner with the same number of seats and flight mileage, which is equivalent to reducing the fuel consumption as well as air pollution by 30~40%.

Figure 2:
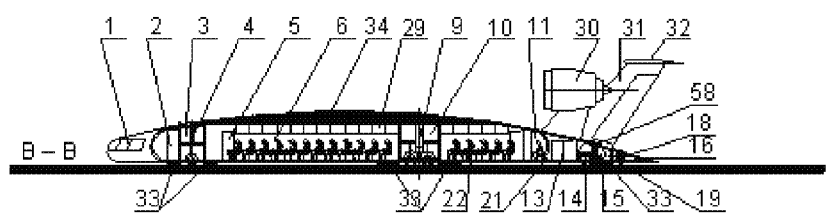
FIG. 2 is the B-B longitudinal sectional view of FIG. 1.

It is obvious from FIG. 2 that the fuselage of the aircraft of this invention (7) has longitudinal section as that of the airfoil section; the control mode of the front undercarriage (4) and the MLG (9) is different from that of the existing aircraft in that the existing aircraft uses rotational mechanism; however, the fuselage (7) of the aircraft of this invention has the space that is large enough for accommodating the vertical retractable undercarriage; in addition, the fuselage (7) is flat; and the passenger cabin (6) does not have the cargo hold underneath; and the jet engine (30) is not suspended beneath the airfoil, instead, it is mounted on the top of the fuselage (7); for the above reasons taken together, therefore, the fuselage (7) can be landed with its bottom close to the ground. To realize this landing, the vertical turnover undercarriage door for the existing aircraft is no longer used; rather, a front and rear sliding door (33) is adopted. On each end of the fuselage empennage (16) in the cargo hold (21), one vertical lift propeller device (58) is incorporated. As shown in the figure, all the front and rear sliding doors (33) of all the undercarriage bays are opened, and the undercarriages are adjusted to the height with the fuselage landed on the ground, and the passenger cabin (6) is ready for passenger boarding.

Figure 3:
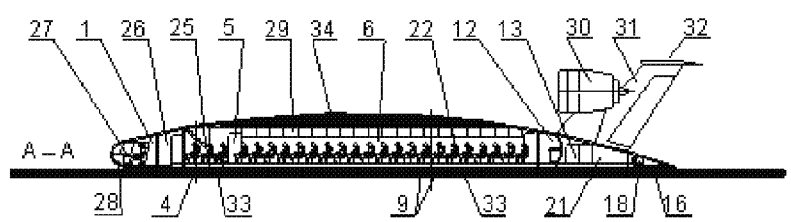
FIG. 3 is the A-A longitudinal sectional view of FIG. 1.

It is obvious from FIG. 3 that the longitudinal section at the longitudinal centerline of the fuselage (7) of the aircraft of this invention also matches the section form of the airfoil. In the front of the fuselage (7) is the pilot compartment (1), where the instrument panel (27) and the pilot radar chamber (28) are located. Against the pilot compartment (1) is the engine room (26). On both sides of the engine room are the electronic console chamber (2). The airstairs (25) are for passenger passage to and from the passenger cabin (6) when the aircraft of this invention serves as a floatplane when landing in airport (52). In this case, on both sides of the passenger cabin (6) outside the cabin doors (5), the water is approximately 0.4~1.0 meter deep, and the cabin doors (5) can not be opened for the purpose of safety; because the cabin doors (5) are designed and manufactured for structure strength and rigidity to withstand 0.5~0.6 atmospheric pressure from both the inside and the outside of the cabin, both the cabin doors (5) and the cabin windows (36) are watertight. Above the seat (22) is the luggage compartment (29). At the very end of the passenger cabin (6) is the food serving compartment (12) and the rest room (11), and their locations and the circular corridor in the passenger cabin (6) are designed in favor of the convenience of the service by the stewardess as well as the use by the passengers. The arc external wall in front of the fuselage (7) is the outcome of the front shape of the airfoil, and the rear arc wall of the food serving compartment (12) and the rest room (11) is designed for meeting the special requirement of bearing the swelling effect under 0.5~0.6 atmospheric pressure. As the aircraft of this invention is designed for landing close to the ground of the airport, no airstairs is necessary and the passengers can board with the convenience and swiftness as boarding a bus; furthermore, because the aircraft of this invention intends to function as a floatplane that can land on water, the engine (30) can not be suspended beneath the airfoil as in the existing aircraft; instead, it is mounted above the rear fuselage (7). Still, the fuselage empennage (16) can be rotated around the rotating shaft (18) behind the cargo hold (21); when the aircraft of this invention takes off and lands on the runway, the fuselage empennage can bend upward to function as the flat empennage while reducing the risk of the fuselage empennage (16) being rubbed against the ground, which is helpful for increasing the angle of attack during the take off; when the aircraft of this invention takes off and lands on water, the fuselage empennage can bend upward, for downward pressing of the rear fuselage (7) under the effect of the water current, while the front side develops the angle of attack for taking off upward. In this figure, the passengers are coming into the passenger cabin (6) in succession.

Figure 4:
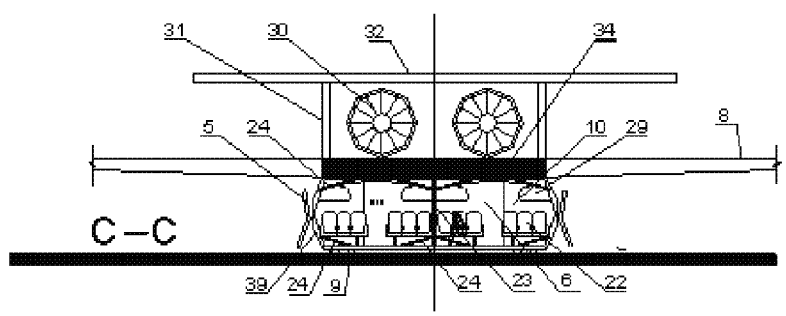
FIG. 4 is the C-C enlarged transverse sectional view of FIG. 1.

As illustrated in FIG. 4, when the aircraft of this invention stays close to the ground, the ground clearance of the bottom of the passenger cabin (6) is about 0.2 meter, and the ground clearance of the floor of THE passenger cabin (6) is about 0.32~0.36 meter; hence the passengers may board the aircraft without the airstairs with the convenience and swiftness as boarding the bus. The flat shaped passenger cabin (6) is separated by the columns (23) into two symmetric and matching left and right compartments, wherein the seats (22), the luggage compartment (29) and the aisle are arranged exactly the same. Because the passenger cabin (6) needs to stand the swelling force under 0.5~0.6 atmospheric pressure, the transverse framework (39) on both sides of passenger cabin is in the form of the arc wall, and one row of columns (23) are set along the longitudinal center line of the flat shaped passenger cabin (6), so as to reduce the structure span of the transverse framework (39) of the passenger cabin. In addition, for further reduction of the structure span and improvement of the structure stress, and for reduction of the structure bending moment for reducing the structure weight of the fuselage (7), and for making use of the upper space within the luggage compartment (29) and the space beneath the seats (22), the oblique struts (24) are added on the upper and the lower ends of the arc walls on both sides of the columns (23) and both sides of the transverse framework (39) of the passenger cabin. As illustrated in FIG. 1, if the design adopts equal spacing of the longitudinal arrangement of the transverse framework (39) of the passenger cabin (6) and of the seats (22), and the seats (22) are arranged along both sides of the center line of the transverse framework (39) of the passenger cabin, the seats (22) installed in this manner do not impact the comfort of the passengers; and those in the passengers cabin (6) can not view the oblique trusts (24) hidden underneath the seats (22) and in the luggage compartment (29); hence the inner view in the passenger cabin is as aesthetic as that of the civil airliner. Furthermore, with protection of the inward oblique arc wall, the passengers in the farthermost seats on both sides of the passenger cabin (6) are prevented from the head collisions like that of the civil airliner. Besides, the inward oblique arc wall within the existing aircraft limits the luggage compartment (29) to be just enough for the small trunks; in contrast, the luggage compartment (29) of the aircraft of this invention is spacious and allows for storage of luggage of sufficient size.

Figure 5:
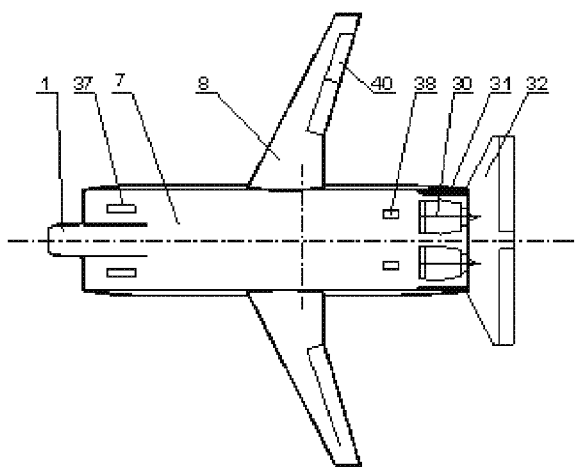
FIG. 5 is the top view of the exterior of the passenger cabin (two-compartment cabin).

FIG. 5 is the top view of the aircraft of this invention. The upper surface of the fuselage (7) has two top cabin doors (37) in the front, which serves for boarding passengers into the passenger cabin (6) as this aircraft lands as a floatplane in the harbor airport (52); and two top exits (38) are arranged next to the engine (30) for an emergency evacuation when this aircraft functions as a floatplane.

Figure 6:
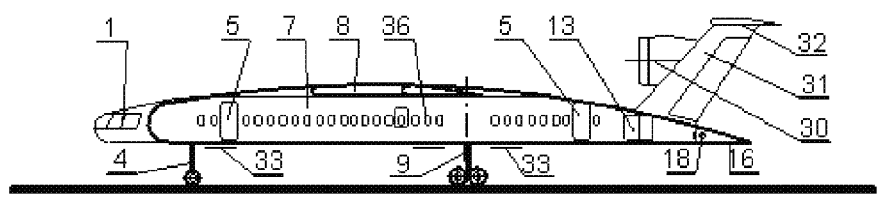
FIG. 6 is the side view of the exterior of the passenger cabin (two-compartment cabin).

FIG. 6 is the side view of the aircraft of this invention during parking and preparing to takeoff from the airport, when the front undercarriage (4) and MLG (9) extend to the technical height for the ground clearance of the fuselage (7). The airfoil (8) is mounted on the airfoil assembly center (34) on the top central part of the fuselage (7). The figure also illustrates the locations of the cabin door (5), the cabin window (36) and the cargo hold door (13), which are the traffic doors for the passengers entering the cabin (6) and the cargo hold (21).

Figure 7:
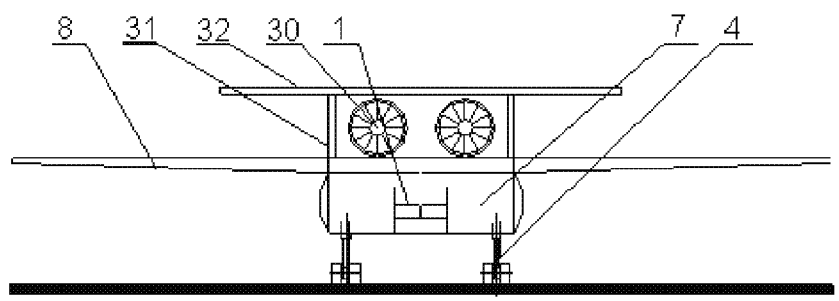
FIG. 7 is the front view of the exterior of the passenger cabin (two-compartment cabin).

FIG. 7 is the front view of the exterior of the aircraft of this invention. Due to the width of the fuselage (7), the front undercarriage (4) and the MLG (9) are not required to be mounted on the base of the airfoil (8).

Figure 8:
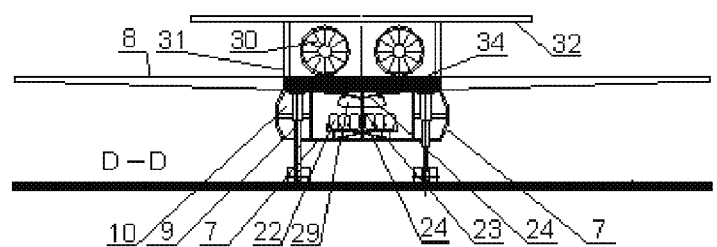
FIG. 8 is the D-D transverse sectional view of FIG. 1.
Figure 9:
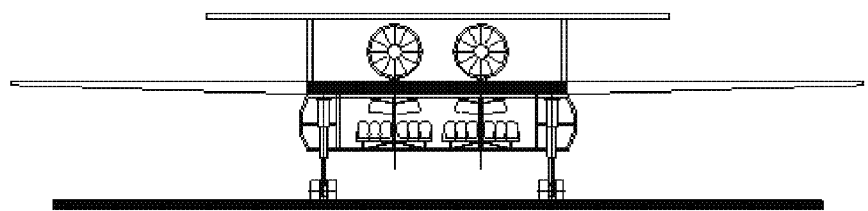
FIG. 9 is the D-D transverse sectional view of the passenger cabin (three-compartment cabin).
Figure 10:
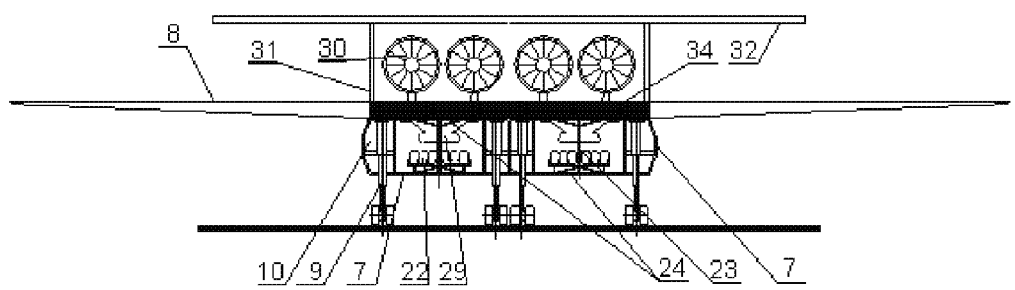
FIG. 10 is the D-D transverse sectional view of the passenger cabin (four-compartment cabin, equivalent to A-380 airbus).

FIGS. 8, 9 and 10 represent longitudinal view of the aircraft of this invention respectively of second-compartment, third-compartment and fourth-compartment passenger cabins (6) at the location of the MLG (9). Because the fuselage (7) is flat shaped, wide and tall, the MLG bay (10) can be directly placed in the passenger cabin (6), and at the same time the aircraft is stably supported by the main undercarriage (9) and the front undercarriage (4). The main undercarriage (9) is mounted in the MLG bay (10), and the top of the main undercarriage is connected with the airfoil assembly center (34); and the fuselage (7) is also tightly connected with the airfoil assembly center (34); hence, the airfoil assembly center (34) serves the dual functions of reinforcing the strength and rigidity of the overall structure of the fuselage (7). The airfoils (8) are mounted on both sides of the airfoil assembly center (34). The large space on top of the passenger cabin (6) makes it impossible for the MLG bay (10) not bulging from the fuselage (7), hence it will not interfere with the normal form of the fuselage (7) as a lifting body, i.e. it will not reduce the elevating force of the fuselage (7) in flight. In this figure, the main undercarriage (9) is at its maximal vertical extension, and the status of the aircraft of this invention is at parking or ready for takeoff. The figure shows that the full load of the aircraft is transferred to the ground directly via the main undercarriage (9); the path for the force transfer is simple, and is advantageous for reducing the aircraft structure weight while maintaining the structure strength and rigidity of fuselage (7).

Figure 11:
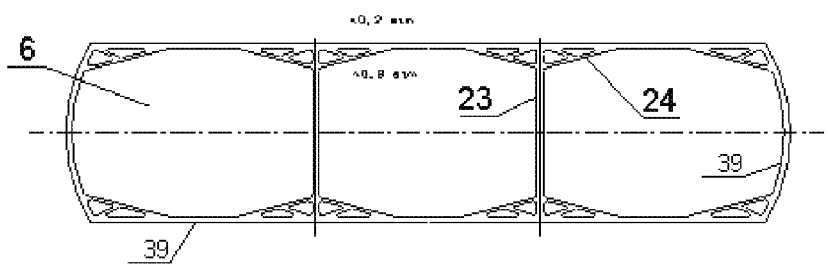
FIG. 11 is the enlarged sectional view of the transverse framework of the passenger cabin (three-compartment cabin).

In FIG. 11, the third-compartment passenger cabin (6) is used as an example to illustrate the structure characteristics of the transverse framework (39) of the passenger cabin of the aircraft of this invention (second-compartment and forth-compartment are mainly the same as the third-compartment passenger cabins). The third-compartment passenger cabin is equivalent to the horizontal assembly of the transverse section of the fuselage of an existing A320 airliner (single aisle with three seats installed on both sides, which is the most economic and practical layout) with the elimination of the cargo hold previously underneath the passenger cabin. When the existing civil airliner cruises at more than 10,000 meters in the sky, where the air is thin at only 0.2~3 atmospheric pressure (namely, 0.20~0.3 atm), if the atmospheric pressure in the cabin is the same, the passengers will feel hard to breathe and their lives are at danger. For easy breath, at least 0.8 atm is required for the passenger cabin (6); and the passenger cabin (6) is inflated by a mechanical equipment. To this end, the structure of the passenger cabin (6) must withstand the swelling force of 0.5~0.6 differential atmospheric pressure between the inside and the outside of the cabin; namely, the passenger cabin (6) casing is subject to 5~6 ton/square meter pressure; this is the principal reason for which the fuselage section of the existing aircraft is designed to be round shaped. Still, round fuselage section of the existing aircraft brings about many unavoidable disadvantages. Thus remarkably improved performance of the existing civil airliner relies upon the radical breakthrough and improvement in its structure configurations.

The success of the aircraft of this invention depends ultimately upon its ability of bearing 5~6 ton/square meters outward force on its casing structure of the flat shaped passenger cabin (6). To this end, first, both sides of transverse framework of the passenger cabin (39) must not be manufactured as flat planes, but rather as bulging arc surfaces instead, which is similar to the existing airliner; because the linear size on both sides of passenger cabin is identical (6), the practice of opening cabin door (5) and cabin window (36) on the arc wall on both sides of the passenger cabin (6) is completely identical as the existing aircraft. Then, columns (23) are added in the transverse framework (39) of the passenger cabin to reduce the transverse span of the flat cabin (6); it is not enough by merely adding columns (23), and the oblique trusts (24) should be added on the upper and lower sides of columns (23). The length projection of the oblique trusts (24) is approximately ⅓ (approximately 1.2~1.3 meter) of each span of the transverse framework of the passenger cabin (39); and the height of the oblique trusts (24) under the columns (23) is approximately the space (approximately 0.3~0.35 meter) underneath the seat (22); and the height of the oblique trusts (24) above the columns (23) is not more than the upper space on top of the luggage compartment (29). So each span of the passenger cabin (6) can be considered as an octagonal structure, which is much better than a rectangular structure in withstanding stress; though it is slightly less optimal than an oblong structure, it approximates an oblong structure; as the three compartments are tightly coupled through the airfoil assembly center (34) above the passenger cabin (6), the structure strength and rigidity of the transverse framework of the passenger cabin (39) as an integral whole are reinforced substantially. The longitudinal section of the fuselage (7) matches the foilage section, and its front is in arc shape; as the common rear wall of the cargo hold (21) and the passenger cabin (6) is constructed as an arc wall, the passenger cabin (6) composed of longitudinal members of transverse framework of the passenger cabin (39) and fuselage framework (41) can withstand 5~6 ton/square meters outward force.

Figure 12:
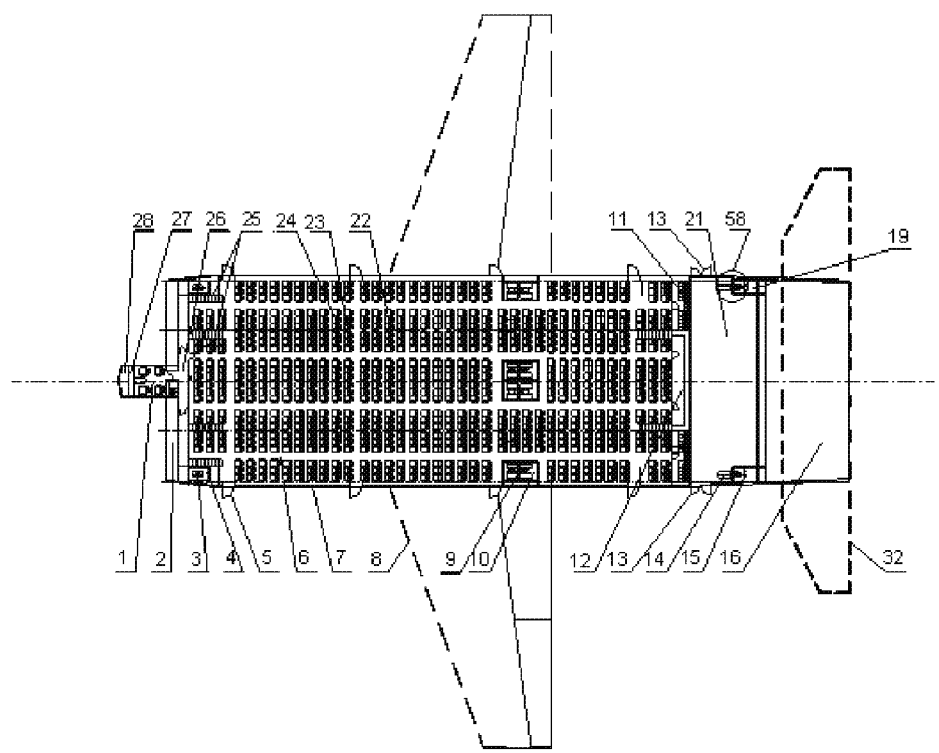
FIG. 12 is the layout plan of an embodiment of the aircraft of this invention (four-compartment cabin, equivalent to A-380 airbus).
Figure 13:
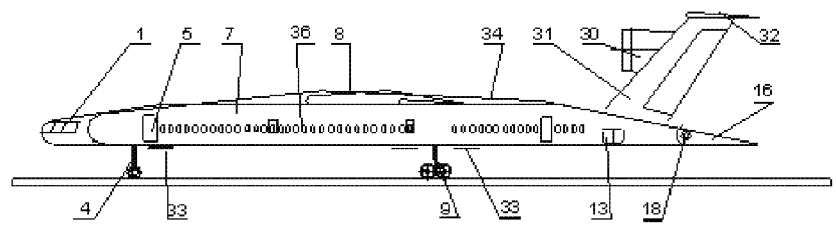
FIG. 13 is the side view of an embodiment of the aircraft of this invention (four-compartment cabin, equivalent to A-380 airbus).

FIGS. 12 and 13 are the layout plan and the side view of an embodiment of the fuselage (7) for the aircraft of this invention (four-compartment, equivalent to an A-380 airbus). In the figure, the passenger cabin (6) is arranged as four compartments, and more than 800 seats (22) can be arranged within one floor. Four longitudinal aisles of the four-compartment and several transverse aisles directly connecting to the cabin door (5) form the convenient, circular and safe passages. Due to the heavy weight of the aircraft, four main undercarriages (9) are set; as the fuselage (7) is flat shaped and wide, the four main undercarriages (9) can be arranged in a line; this way, the four main undercarriages (9) are subject to loading or unloading concurrently during takeoff and touchdown for uniform loading; the four MLGs (9) are of identical type (the A-380 airbus MLGs mounted underneath the fuselage or the airfoil base are of different heights, thus MLGs of two types are needed). Due to the single floor arrangement of the passenger cabin (6) with the cargo hold (21), the undercarriages can be retracted before landing on the ground; this is much more convenient for the final assembly and the adjusting of the various systems, and it shortens the manufacturing cycle and reduces the manufacturing cost.

FIGS. 14 to 17 are the aircraft of this invention in the process of from landing on the ground of the airport to takeoff.

Figure 14:
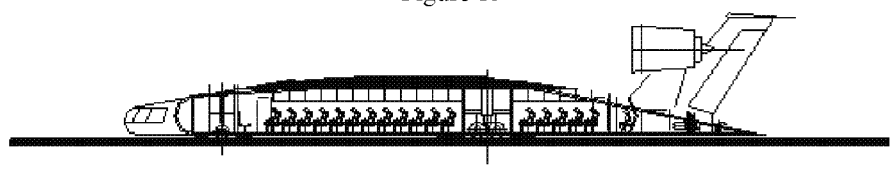
FIGS. 14 to 17 are an embodiment of the aircraft of this invention in the process of from ground landing to takeoff.

In FIG. 14, MLGs (9) are compressed until the ground clearance of the fuselage underplate is of approximately 0.2 meter; the fuselage (7) is landed close to ground; no traditional airstairs are necessary; and the passengers can board on and off the aircraft like a bus. This figure shows the passengers boarding on the aircraft.

Figure 15:
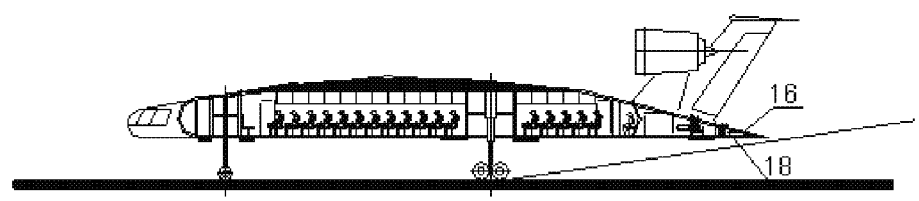

In FIG. 15, all passengers are on board, and the aircraft can take off; both the front undercarriages (4) and the MLGs (9) vertically extend simultaneously until the fuselage (7) rise to a given height, indicating readiness for takeoff.

Figure 16:
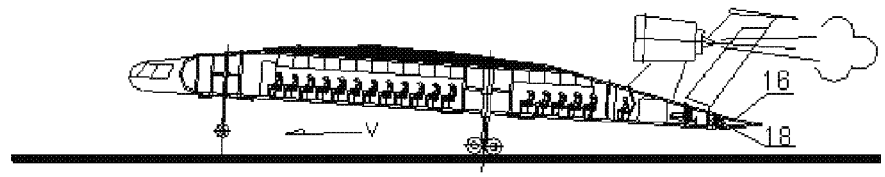

In FIG. 16, jet engine (30) starts to jet; together with the action of the flat empennage (32), the front undercarriage (4) is cleared from the ground; and the aircraft of this invention glides on the runway and is at takeoff mode.

Figure 17:
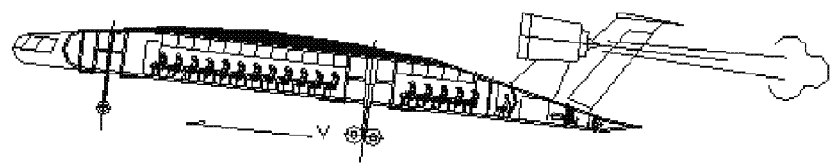

In FIG. 17, jet engine (30) continues jetting; and the angle of attack increases with the action of the flat empennage (32); both the front undercarriages (4) and the MLGs (9) are cleared from the ground, and the aircraft of this invention is at flight mode.

After several minutes, the front undercarriages (4) retract into the front undercarriage bay (3), and the MGLs (9) retract into the MLG bay (10); then the front and the rear sliding doors (33) start to slide simultaneously to close the front undercarriage bay (3) and the MLG bay (10); and the aircraft of this invention is at the cruise mode.

FIGS. 18 to 21 are the structure and the operational mechanisms of the vertical lift propeller device (58). When the aircraft of this invention functions as a floatplane by landing on water, it needs to control the landing, steering and departure with the vertical lift propeller device (58) in a harbor airport.

Figure 18:
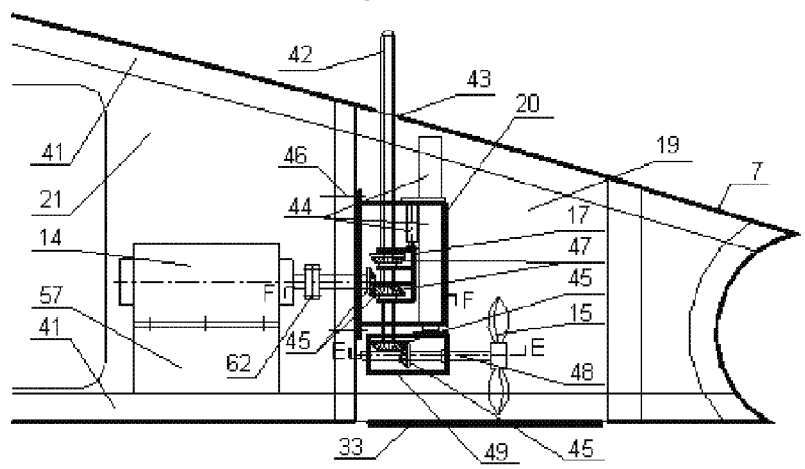
FIGS. 18 to 21 are the structure drawing of the vertical lift propeller of the aircraft of this invention for functioning as a floatplane.

In FIG. 18, the propeller (15) retracts into the propeller chamber (19); the front and rear sliding doors (33) close the propeller chamber (19) in the same manner as closing the front undercarriage bay (3) and the MLG bay (10), so as to decrease the atmospheric drag in flight. The fuel-oil engine (14) on the mounting base (57) in the cargo hold (21) drive the bevel gear (45) and the loose bevel gear (47) through the coupling (62) and the shaft (48); at the center of the loose bevel gear (47) are the hexagonal holes with the hexagonal shaft (42) fitting in; a small hydraulic cylinder (44) mounted on the stationary gearbox (20) pushes and pulls the steering sleeve (17) via the piston (50), so that both the loose bevel gear (47) simultaneously move up and down with the hexagonal shaft (42); but only one loose bevel gear (47) (the lower loose bevel gear as shown in the figure) drives the hexagonal shaft (42) and drives the two bevel gears (45) mounted in the moveable gearbox; then the bevel gear (45) drives the propeller (15) to rotate via the shaft (48). In contrary, the large hydraulic cylinder (44) mounted in the stationary gearbox (20) is coupled to the casing of the moveable gearbox (49) via the piston (50), and the moveable gearbox (49) moves up and down against the stationary gearbox (20) fixed on the fuselage framework (41) with the locking bolts (46).

Figure 19:
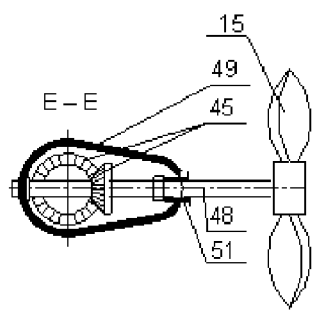

FIG. 19 is the E-E sectional view of the moveable gearbox (49), illustrating that the bevel gears (45) drives the propeller (15) to rotate via the shaft (48).

Figure 20:
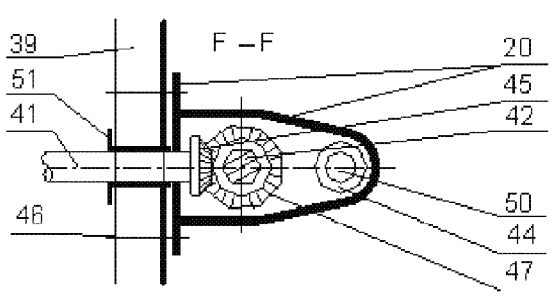

FIG. 20 is F-F sectional view of the stationary gearbox (20), illustrating that the shaft (48) of the fuel-oil engine (14) drives the bevel gear (45) and the loose bevel gear (47) to rotate; at the center of the loose bevel gear (47) are the hexagonal holes with the hexagonal shaft (42) fitting in; the piston (50) is in the hydraulic cylinder (44).

Figure 21:
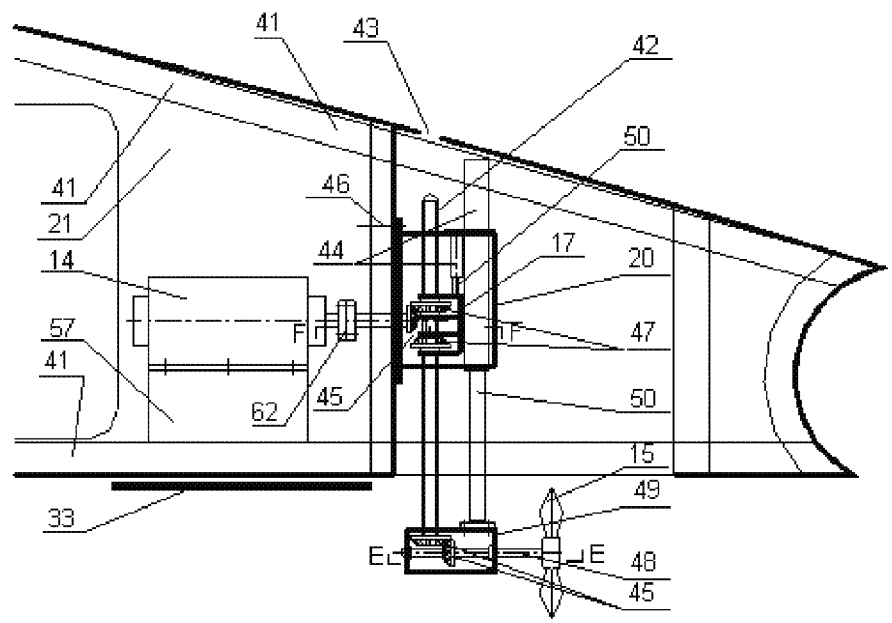

In FIG. 21, the front and the rear sliding doors (33) slide forward to open the lower opening of the propeller chamber (19); the large hydraulic cylinder (44) extends downward via the piston (50), so as to extend the moveable gearbox (49), the hexagonal shaft (42) and the propeller (15) into water out of the propeller chamber (19); if the fuel-oil engine (14) is started at this moment, the propeller (15) rotates and drives water flow, so as to drive the aircraft on water. When the small hydraulic cylinder (44) drives the steering sleeve (17) to move downward through the downward extension of the piston (50), so that the loose bevel gear (47) above contacts the bevel gear (45) driven by the shaft (48) of the fuel-oil engine (14), the propeller (15) rotates reversely to drive water flow reversely, so as to generate the reverse force for the aircraft on water. When the propeller (15) rotates in water, the pilot may control the two vertical lift propeller devices (58) mounted at both rear corners of the cargo hold (21); only by controlling the orderly up-and-down movement of the piston (50) in the small hydraulic cylinder (44) in the two stationary gearboxes (20) can the pilot control the advance, backward and left-right steering of the aircraft of this invention on water in the harbor airport.

FIGS. 22 to 26 are the aircraft of this invention in the process of from landing on water to cruise flight above water; during the process both the front and the rear sliding doors (33) of the front undercarriages bay (3) and the MLG bay (10) are closed.

Figure 22:
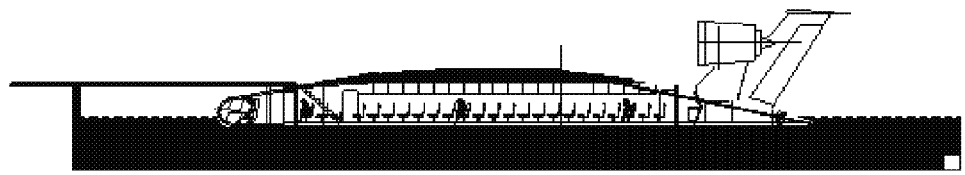
FIGS. 22 to 26 are the aircraft of this invention in the process of from water landing to surface cruise.

In FIG. 22, all passengers within the airport walk into the cabin (6) in order.

Figure 23:
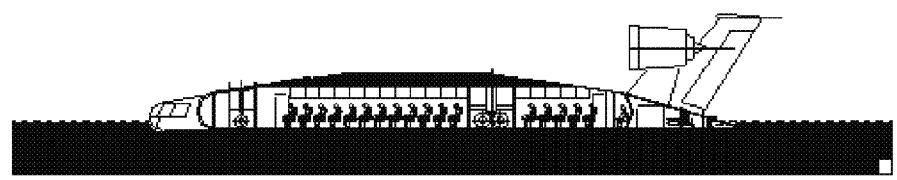

In FIG. 23, all passengers are boarded in the cabin (6); the top cabin door (37) is closed; the pilot controls the two vertical lift propeller devices (58) mounted in the cargo hold (21) according to the sequence requirement; the aircraft departs and steers, and is ready for takeoff.

Figure 24:
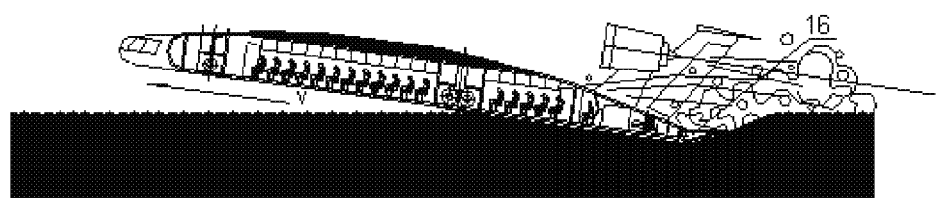

In FIG. 24, the jet engine (30) starts to jet; the pilot controls the fuselage empennage (16) for the upward movement; when the aircraft of this invention moves forward, the fuselage (7) front-side faces upward for taking off from water.

Figure 25:
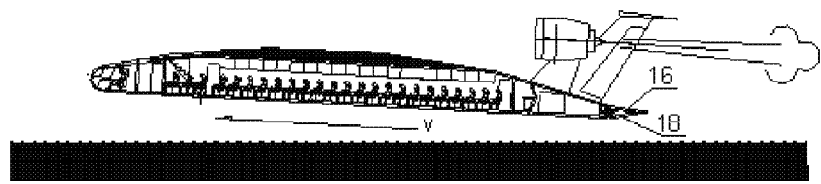

In FIG. 25, the aircraft of this invention takes off from water and flies forward by the driving force of the jet engine (30) and the ground effect.

Figure 26:
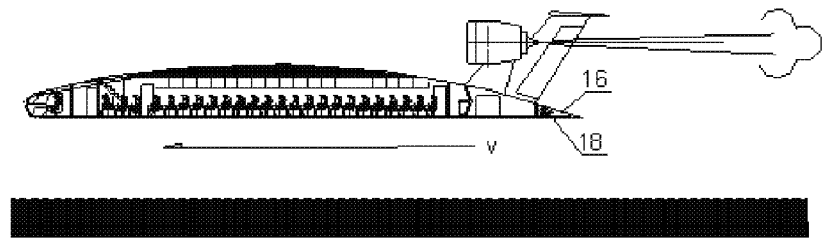

In FIG. 26, the aircraft of this invention makes cruise flight 4~12 meter above water by the driving force of the jet engine (30) and the ground effect; due to the ground effect, 5~10% less aviation oil is consumed than flying at 10,000 meter in the sky. Again, as the floatplane always flies 4~12 meter above water, the passengers tend to feel safer than during a flight at 10,000 meter in the sky. However, calm weather is the precondition, together with a visibility of more than several kilometers and few vessels in the sea, thus it is particularly suitable for airliner flying across oceans (pacific ocean, Atlantic and etc). In the case of a sudden foul weather during the flight on the sea, the aircraft of this invention may increase the driving force of the jet engine (30) and ascend the flat empennage (32), so that the aircraft can ascend to 10,000 meter in the sky for the cruise flight as the existing civil airliner.

FIGS. 27 to 34 are the aircraft of this invention (two-compartment passenger cabin) in the process of from landing in airport to departure.

Figure 27:
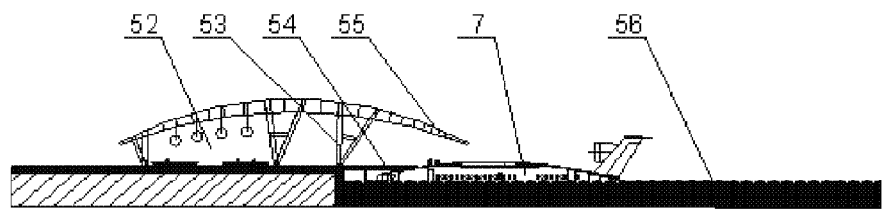
FIGS. 27 to 34 are the aircraft of this invention (two-compartment passenger cabin) in the process of from landing in the harbor airport to departure.

In FIG. 27, the aircraft of this invention lands in the wharf (54) of the airport (52); the passengers within the airport walk into the passenger cabin (6) through the top cabin door (37); as the opening of top cabin door (37) is toward the sky, and to avoid rainwater from entering into the passenger cabin (6), the rain shed (55) of the airport (52) needs a large cantilever span; hence the wharf (54) needs to set the roof strut (53) for the rain shed (55).

Figure 28:
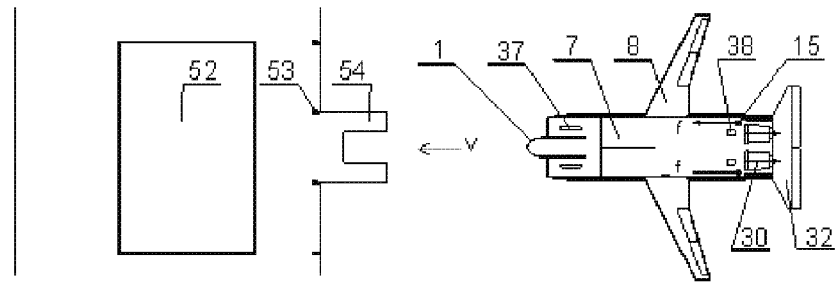

FIG. 28 is the top view of the aircraft of this invention slowly approaching the airport driven by the two vertical lift propeller devices (58).

Figure 29:
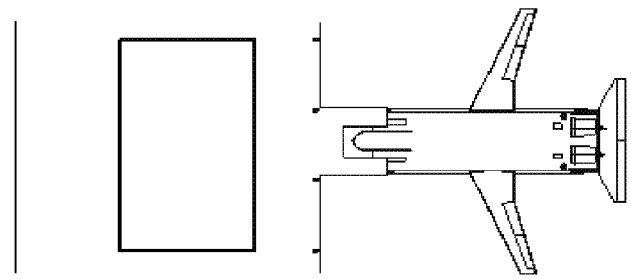

FIG. 29 is the top view of the aircraft of this invention landing in the wharf (54) of the airport (52) after the two vertical lift propeller devices (58) are closed.

Figure 30:
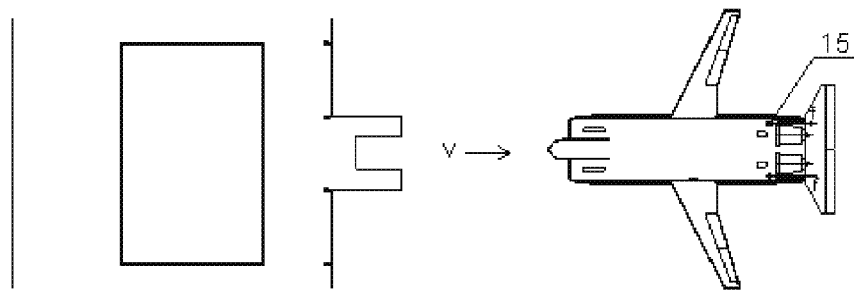

FIG. 30 is the top view of the aircraft of this invention departing from the airport for a given distance after starting the two vertical lift propeller devices (58).

Figure 31:
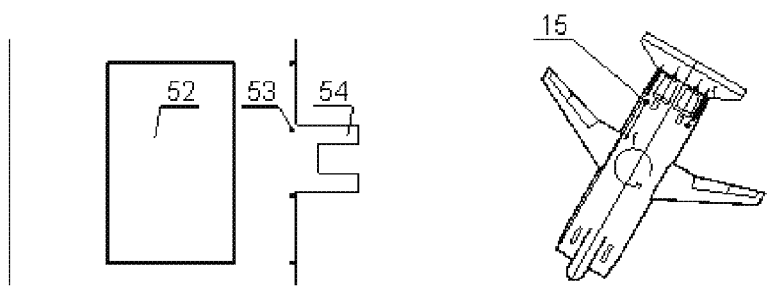
Figure 32:
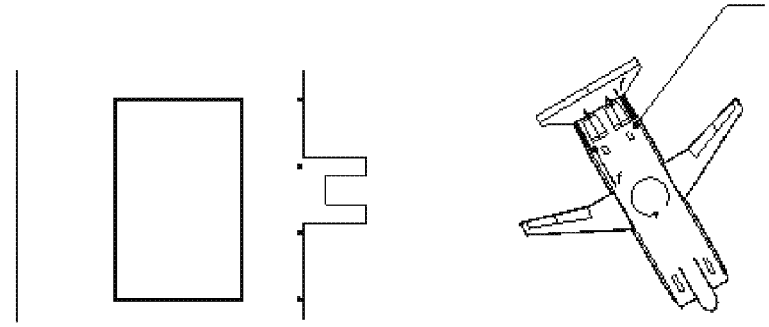

FIGS. 31 to 32 are the top views of the aircraft of this invention steering above water after departing from the airport for a given distance, with the right vertical lift propeller device driving forward and the left one dragging backward.

Figure 33:
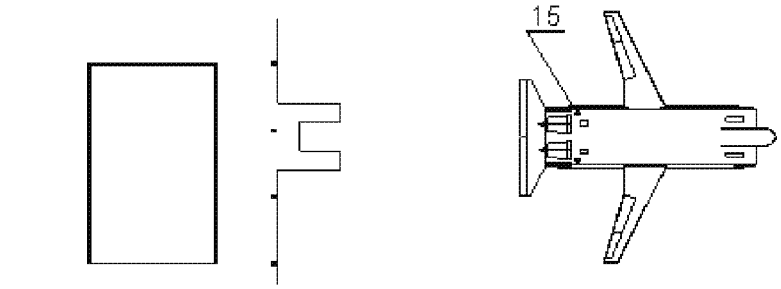

FIG. 33 is the top view of the aircraft of this invention steering away from the airport (52) on water and ready for departure.

Figure 34:
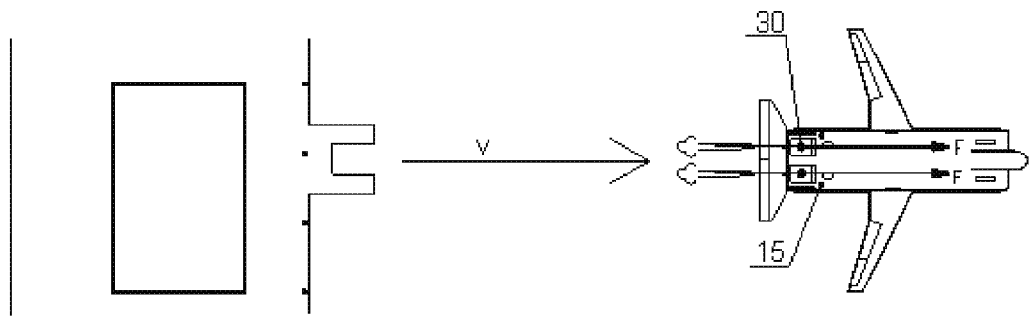

FIG. 34 is the top view of the aircraft of this invention departing from the water driven with the started jet engine (30) jetting; and the aircraft takes off from water as being propelled by the jet engine (30).

Figure 35:
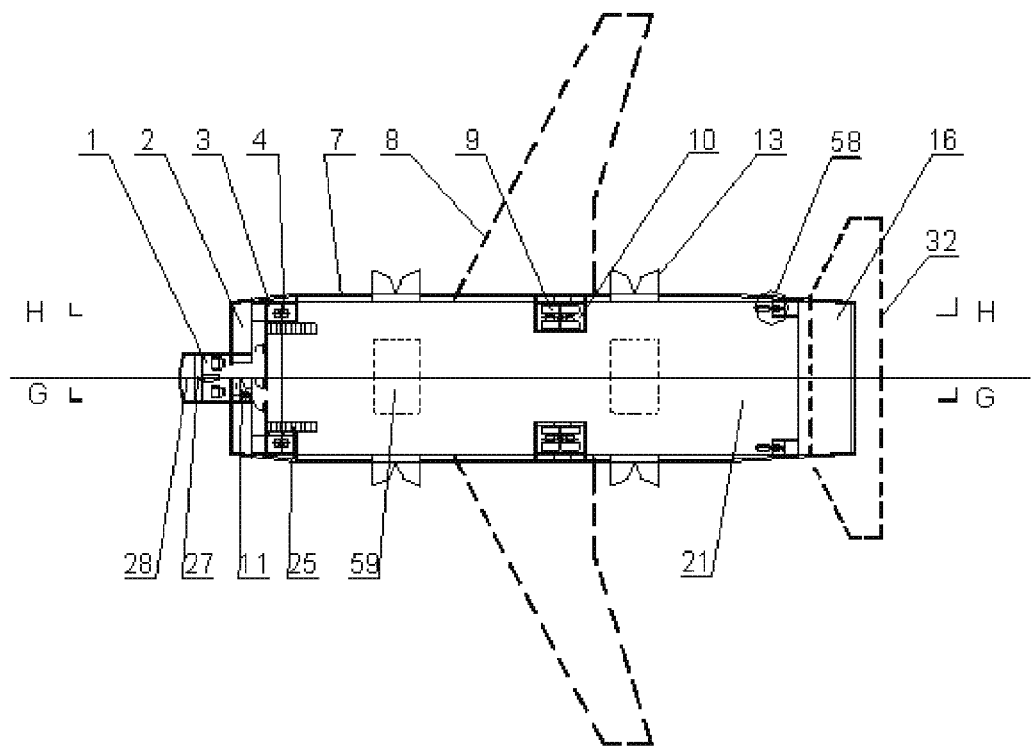
FIG. 35 is the layout plan of the compartments of an embodiment of the aircraft of this invention (amphibious aircraft) as a cargo aircraft.
Figure 37:
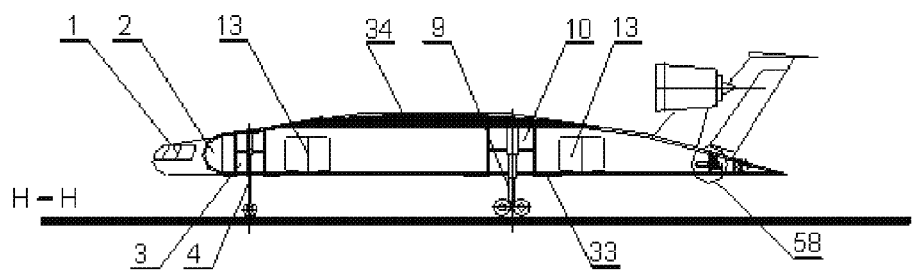
FIG. 37 is the H-H longitudinal sectional view of FIG. 35.

FIGS. 35 and 37 are the embodiments of the aircraft of this invention (amphibious aircraft) functioning as the amphibious cargo aircraft; the three drawings illustrate the states of the aircraft in use when landed in the airport.

In FIG. 35, most of the configuration layout is identical with the current amphibious aircraft; as the cargo aircraft does not carry passengers, the cargo hold (21) needs no inflation; thus the fuselage framework (41) of the cargo hold (21) does not need to withstand the outward force, leading to the low load of the fuselage framework (41); no additional column (23) is necessary for reinforcing the cargo hold (21). However, for the pilot to obtain the easy breath in the pilot compartment (1), consideration should be given to the structure against outward force in the pilot compartment (1). While in service at the airport, loading and unloading cargo can begin with opening the cargo hold doors (13) on both sides.

Figure 36:
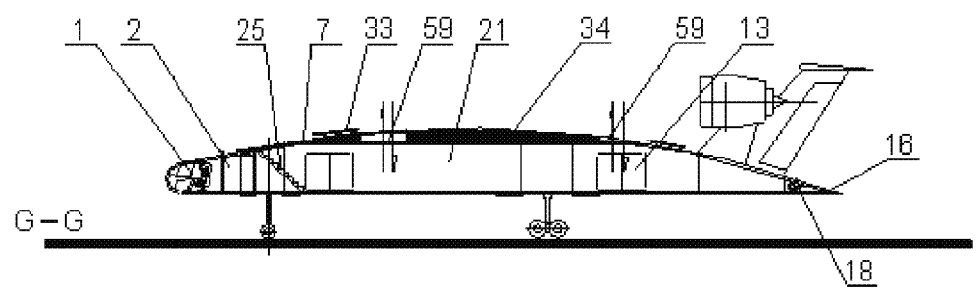
FIG. 36 is the G-G longitudinal sectional view of FIG. 35.

In FIG. 36, when the MLGs (9) and the front undercarriages (4) are compressed to the identical height of a cargo floor of a truck, cargo can be handled to and from the cargo hold door (13). The lifting hole (59) on the top of the cargo hold (21) is applicable when the aircraft of this invention functions as a floatplane; when in use, it needs to open the front and rear sliding doors (33).

FIG. 37 shows the retracted undercarriages of the aircraft at the airport ready for departure.

When the aircraft of this invention serves as a cargo aircraft for loading cargo on water, the above three drawings should have the following variations.

In FIG. 35, both the MLG bay (10) and the front undercarriage bay (3) are closed by the front and rear sliding doors (33); as water of certain depth is at the outside of the cargo hold (21), cargo hold doors (13) are not to be opened on both sides of the cargo hold (21); the aircraft of this invention loads and unloads cargo on water by the overhead crane in the airport (52), simply by opening the lifting hole (59) on the top of the cargo hold (21).

In FIG. 36, the aircraft of this invention loads and unloads cargo on water by overhead crane in the airport (52), simply by opening the lifting hole (59) on the top of cargo hold (21). And the crew can access from the top passenger cabin door (37) on the upper door of the fuselage (7).

FIGS. 38 to 41 are an embodiment of the aircraft of this invention functioning as a land cargo aircraft.

Figure 38:
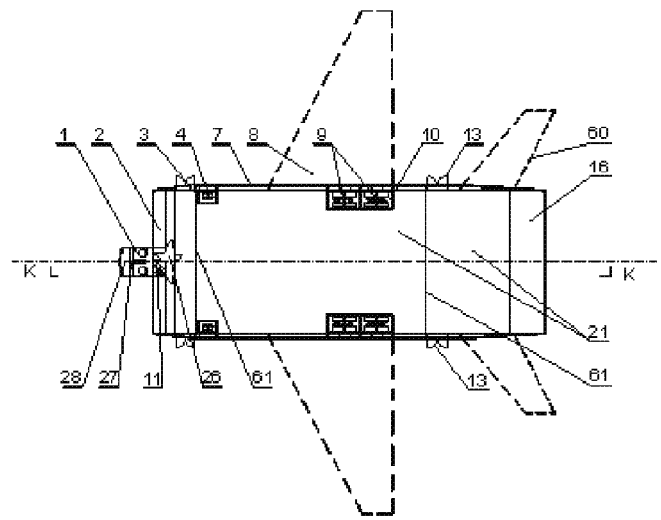
FIG. 38 is the layout plan of the compartment floor of an embodiment of the aircraft of this invention (open-V empennage, land use only) as a cargo aircraft.

In FIG. 38, due to the heavy load of the cargo, four MLGs (9) are required to be assembled. To obtain a spacious interior of the cargo hold (21) for easier loading and unloading cargo, two MLGs (9) are mounted on both sides respectively, and the longitudinal arrangement of the MLGs is against both sides of the cargo hold (21). To achieve convenient handling of bulky cargo, both the front and the rear ends of the cargo hold (21) can ascend to divide the cargo hold (21) into three sections, and two cargo hold opening/closing slots are set on the floor of the cargo hold (61).

Figure 39:
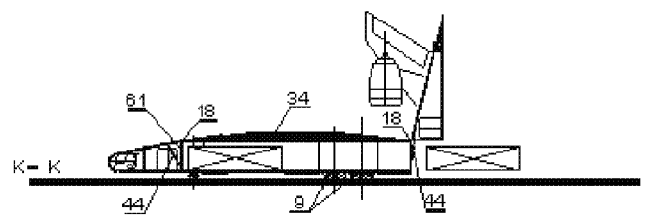
FIG. 39 is the K-K longitudinal sectional view of FIG. 38.

In FIG. 39, in order to load the container into the cargo hold (21), first prop up the rear side of the cargo hold (21) with the hydraulic cylinder (44); then adjust the height of the front undercarriage (4) and the MLG (9) until the floor of the cargo hold (21) is as high as the cargo floor of the container car, so that the container is easily moved into the cargo hold.

Figure 40:
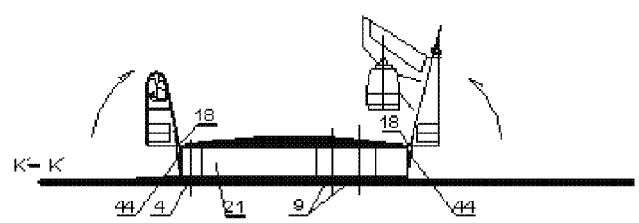
FIG. 40 is the K'-K' longitudinal sectional view of FIG. 38.

In FIG. 40, in order to allow the convenient movement of the moveable equipments such as the loading trucks to and from the cargo hold (21), the aircraft of this invention can land closely to the ground; then prop up the front and the rear of the cargo hold (21) to ascend around the rotating shaft (18) with the hydraulic cylinder (44); then retract the hydraulic cylinder (44) after access of the loading truck, close the cargo hold opening/closing slot (61), and cargo hold (21) returns to its previous state.

Figure 41:
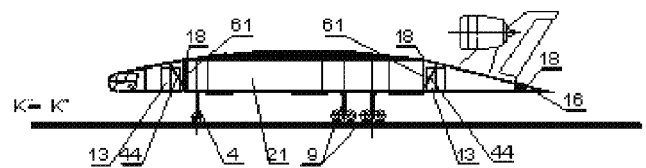
FIG. 41 is the K"-K" longitudinal sectional view of FIG. 38.

In FIG. 41, the cargo is loaded, with the hydraulic cylinder (44) retracted; the cargo hold opening/closing slot (61) is closed and the cargo hold (21) is returned to its previous state; the front undercarriage (4) and MLG (9) retract simultaneously; and the aircraft of this invention as a land cargo aircraft is ready for departure.

Figure 42:
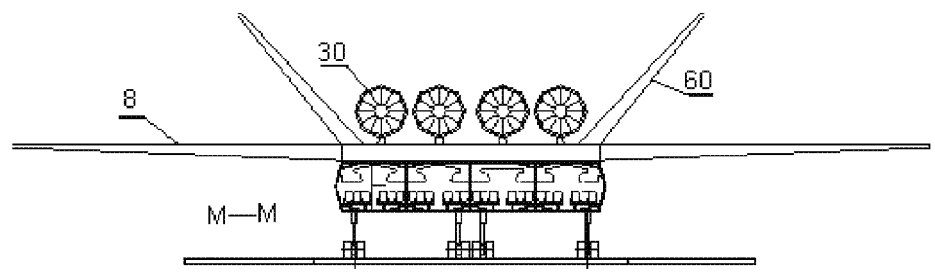
FIG. 42 is the M-M sectional view of FIG. 43.
Figure 43:
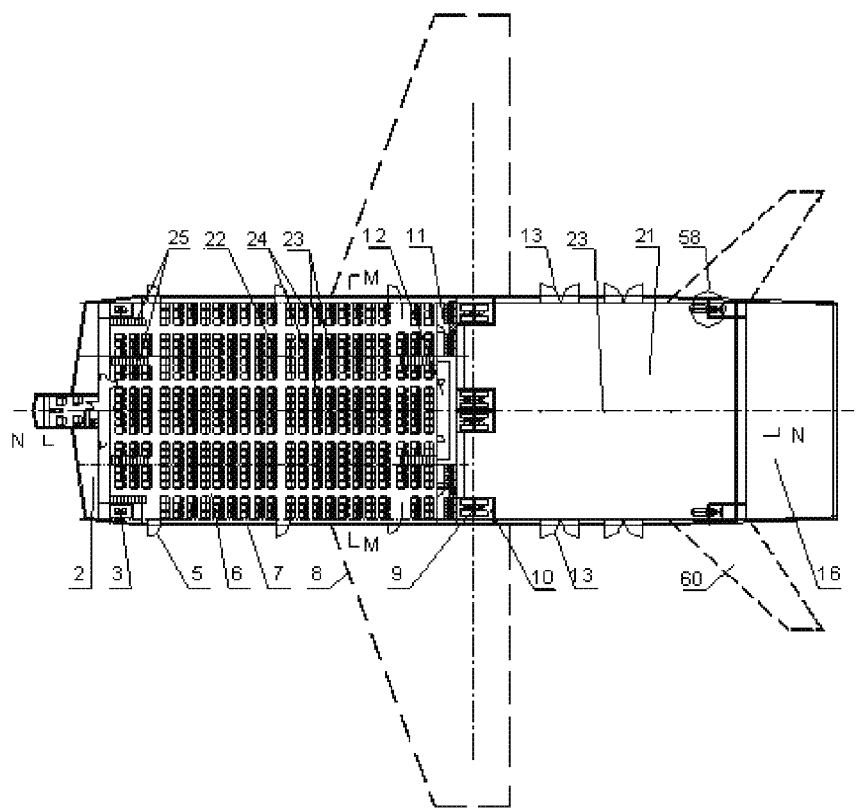
FIG. 43 is the layout plan of the compartment floor of an embodiment of the aircraft of this invention (equivalent to A-380 airbus, open-V empennage, half-and-half areas of passenger cabin and cargo hold, amphibious aircraft).
Figure 44:
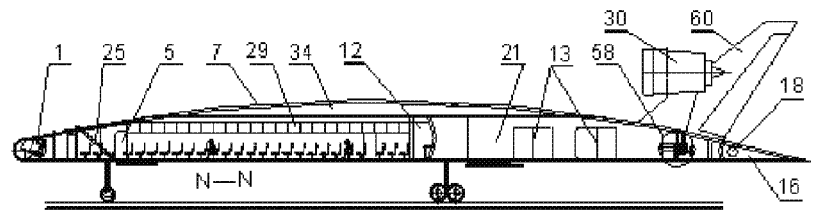
FIG. 44 is the N-N sectional view of FIG. 43.

FIGS. 42 to 44 are another embodiment of the aircraft of this invention (equivalent to a A380 airliner, open-V empennage, amphibious aircraft) functioning as an amphibious aircraft and passenger-cargo plane, with the characteristics that the custom-made adjustable area ratio of the passenger cabin and the cargo hold during the ordering and manufacturing is requested by the client, so that flexible business operation is available for the airlines; the airlines may load more cargo during recession of passengers transport and vice versa; in either case it is helpful for reducing the no-load ratio.

In FIG. 42, due to the wide fuselage (7), an open-V empennage like that of a fighter plane can be incorporated.

In FIG. 43, with regards to the general plan of the fuselage (7), the area distribution of the passenger cabin and the cargo hold is approximately half and half; for the cargo hold (21) is large in area, four cargo hold doors (13) are opened for improving the loading and unloading rate of the cargo. The arc wall between the passenger cabin (6) and the cargo hold (21) also moves forward to the location of the MLG bay (10). There is no bulging stress inside the cargo hold (21) as that in the passenger cabin, so only a few columns (23) are set for reducing the structure weight; or no column (23) is set for the purpose of convenient loading and unloading of the cargo; the option is up to the discretion of the client.

In FIG. 44, the arc wall between the passenger cabin (6) and the cargo hold (21) is at the location of the MLG bay (10); the area distribution of passenger cabin (6) and cargo hold (21) is approximately half and half; and other aspects are identical to those of FIG. 12 to 13.

Figure 45:
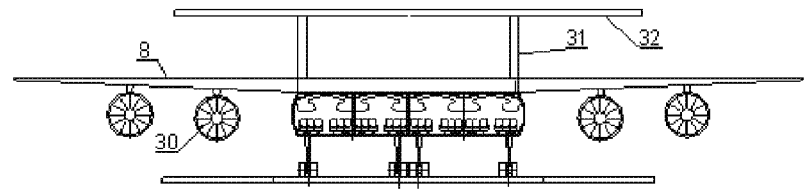
FIG. 45 is the transverse sectional view of the four-compartment passenger cabin of the invention (equivalent to A-380 airbus, for land use only).

FIG. 45 is an embodiment of the aircraft of this invention (equivalent to A380 airliner, for land use only) only functioning as a land aircraft, which is used as a large passenger aircraft as the existing civil airliner; the jet engine (30) is suspended underneath the airfoil (8) like that of the existing civil airliner; because the jet engine (30) lower edge is lower than the underplate of the fuselage (7), the aircraft can not be landed on the ground; instead, it can only be landed with the overhead undercarries similar as the existing civil airliner, and the airstairs are necessary for boarding and landing.

Figure 46:
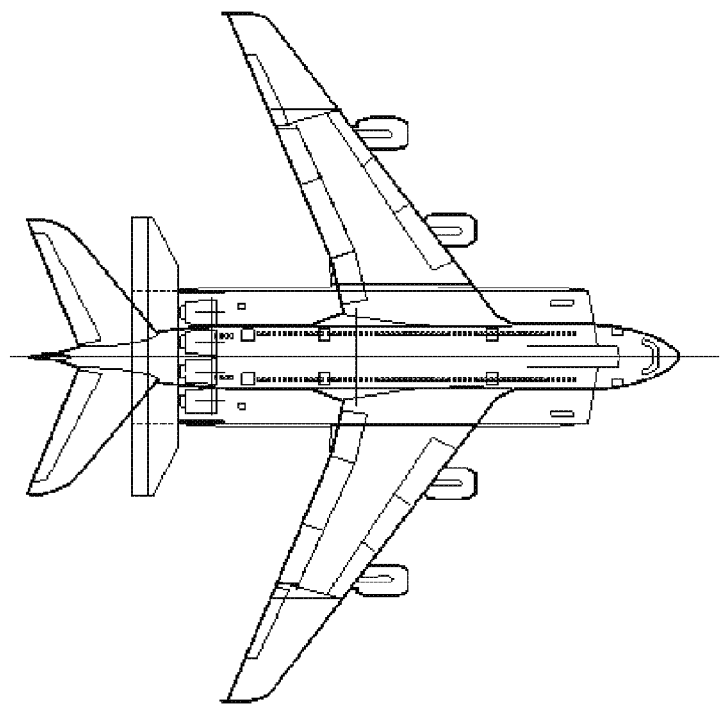
FIGS. 46 to 48 are the dimensional comparison of the four-compartment passenger cabin of the invention (equivalent to A-380 airbus, amphibious aircraft) and the existing A380 airliner.
Figure 47:
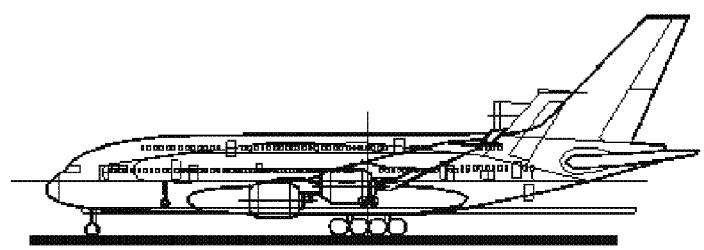
Figure 48:
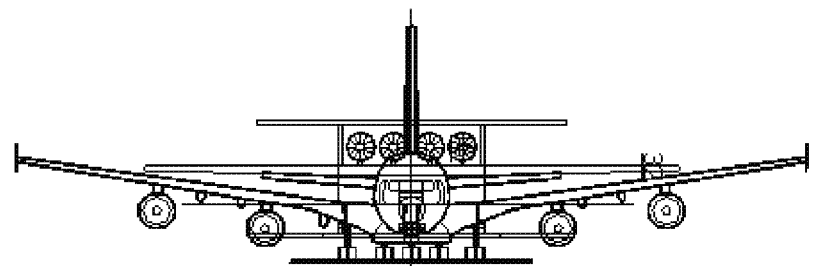

FIGS. 46 to 48 are dimensional comparison drawings of the aircraft of this invention (equivalent to A380 airliner, amphibious aircraft) and the updated A-380 airbus. It is obvious from the figure that the fuselage length, wingspan and height of the large aircraft of this invention are approximately 25~30% less than those of the A-380 airbus.

Figure 49:
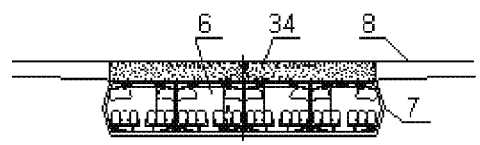
FIGS. 49 to 50 are the enlarged comparison of the front view windward area of the fuselages of the four-compartment passenger cabin of the invention (equivalent to A-380 airbus, amphibious aircraft) and the existing A380 airliner.
Figure 50:
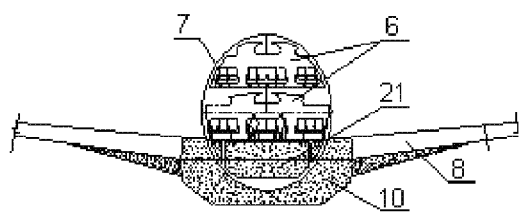

FIGS. 49 to 50 are the comparison drawings of the enlarged front view of the windward area of the large aircraft of this invention (equivalent to A380 airliner, amphibious aircraft) and the updated A-380 airbus. It is obvious from the figure that the front view of windward area of is approximately 10~13% less than that of the A-380 airbus; hence, the atmospheric drag of the aircraft of this invention is 10~13% less than that of the A-380 airbus.

Figure 51:
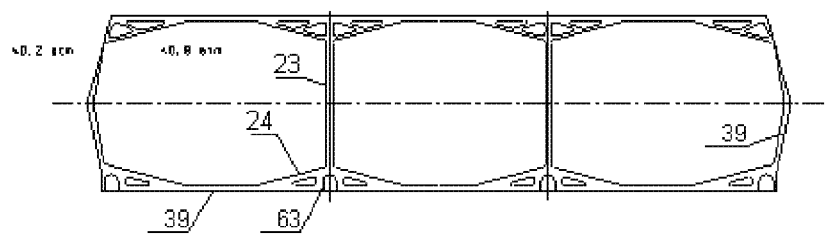
FIG. 51 is the enlarged sectional view of the transverse framework of the passenger cabin with the U-groove of the aircraft of this invention (three-compartment cabin).

FIG. 51 is the enlarged sectional view of the transverse framework of the passenger cabin (39) with the U-groove of the aircraft of this invention (three-compartment passenger cabin). In an case of the breakdown of the jet engine (30) during a flight resulting in lack of dynamics, or in the case of the failure of releasing undercarriages, if there is no broad water area for forced landing in an emergency, distress landing may cause plane crash and casualty. However, if U-groove (63) is added at the structure intersection of the transverse framework of the passenger cabin (39), with strip air cushion (66) filled in, the undercarriages is not required to be released in the event of emergency; the strip air cushion (66) is inflated by opening the valve of the compressed air tank in the aircraft; the strip air cushion (66) immediately swell and automatically blow out the underplate (64) in the snap slot (65) of the U-groove (63); and many strip air cushions are developed underneath the aircraft external panels (67); the length of the strip air cushions (66) can span from the front undercarriage bay (3) to the fuselage empennage (16). In this way, forced landing in an emergency is available on a flat field; due to the flat shaped fuselage and the protection of the strip air cushions (66), the impact of the ground against the aircraft can be buffered substantially, so as to minimize the tragedy of the passengers and crew.

Figure 52:
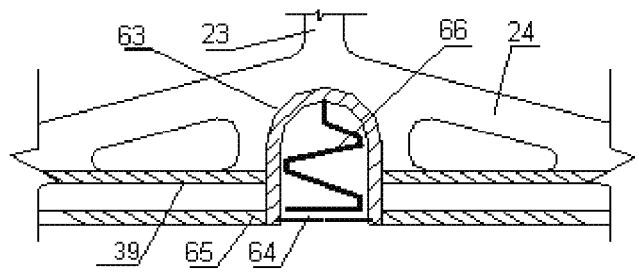
FIG. 52 is the enlarged structure drawing of the U-groove.

FIG. 52 is the enlarged structure drawing of the U-groove. Usually, the underplate (64) in the snap slot (65) of the U-groove (63) supports the strip air cushions (66) to prevent the cushions from falling. Although the aircraft weight is increased with the strip air cushions (66), the aircraft of this invention, however, has no inflatable slide as that of the existing aircraft; it is estimated that the weight of the strip air cushions (66) may not exceed that of the common inflatable slide; thus it is worthwhile to have the cushions that provide safe protection for the passengers and crew during a forced landing on the ground.

Figure 53:
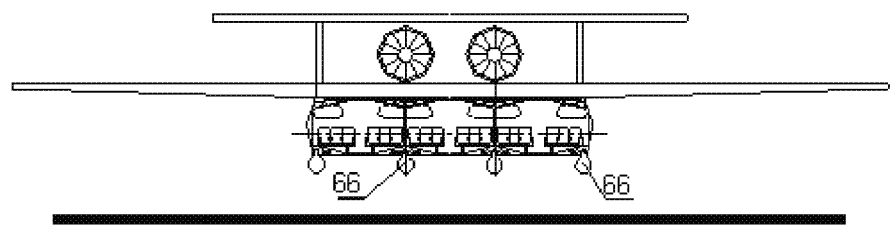
FIG. 53 is the transverse sectional view of the emergency landing of the aircraft of this invention (three-compartment cabin).

FIG. 53 is the transverse sectional view of the aircraft of this invention (three-compartment passenger cabin) in the case of a forced landing in an emergency; when the strip air cushions (66) are opened to buffer the impact of the ground against the aircraft, injury of passengers and crew in the case of accident is minimized.

Figure 54:
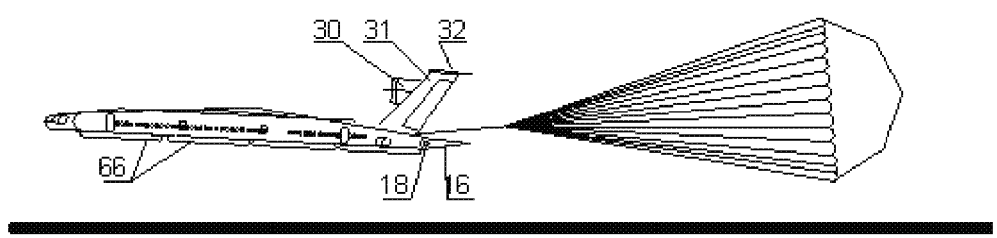
FIG. 54 is the side view of the emergency landing of the aircraft of this invention (three-compartment cabin).

FIG. 54 is the side view of the aircraft of this invention (three-compartment passenger cabin) in the case of forced landing in an emergency; some strip air cushions (66) may fail due to the piercing by the sharp edges on the ground during landing; to keep as many strip air cushions (66) from piercing as possible, strip air cushions (66) are preferred to be at shortened length and to be provided in greater quantity. If the traditional parachutes are placed near the rear cargo hold (21), and the parachutes are simultaneously released with the strip air cushions (66) in the case of the forced landing in an emergency, the aircraft may be further slowed down by the inflated parachutes; with the combined action of the strip air cushions (66) and the parachutes, impact of the ground against the aircraft is buffered further for minimized tragedy of the passengers and crew in the accident.

I claim:

1. A large amphibious aircraft without airstairs, comprising:
   a fuselage;
   a pilot compartment;
   one or more airfoils;
   one or more empennages;
   one or more engines;

one or more undercarriages; and one or more vertical lift propeller devices in an ordered assembly;

wherein the pilot compartment protrudes from the fuselage; longitudinal sections of the fuselage are in a shape of sections of the airfoil; the one or more airfoils extend to two sides from an airfoil assembly center at a center top section of the fuselage;

wherein the one or more engines are mounted on the fuselage and near the empennage; all the undercarriages are mounted in a passenger cabin; the one or more vertical lift propeller devices are mounted at each of two rear corners of the fuselage;

wherein two front undercarriage bays and several main landing gear (MLG) bays are mounted in the fuselage; front undercarriages are mounted within the front undercarriages bay; MLGs are mounted within the MLG bays; all the front undercarriages and the MLGs are vertically retractable; each of the front undercarriage bays and the MLG bays is mounted with a sliding door; and wherein the one or more vertical lift propeller devices are each formed by orderly assembly of the one or more engines in a cargo hold, a stationary gearbox, a movable gearbox, and propellers in a propeller chamber; the propeller chamber is mounted with front and rear sliding doors.

2. The large amphibious aircraft without airstairs of claim 1, wherein the fuselage is of a flat oblong shape at a longitudinal plane; the pilot compartment protrudes from a middle section of the fuselage; the longitudinal sections of the fuselage are in the shape of the sections of the airfoil; the lower fuselage serves as the passenger cabin with sufficient upper space for comfort of the passengers; a middle top section above the passenger cabin is arranged with the airfoil assembly center; the lower space in the rear fuselage serves as the cargo hold and a fuselage empennage; the fuselage empennage can flap up and down around a rotating shaft behind the cargo hold; two sides of the fuselage are arc planes; the passenger cabin is divided by flat transverse frameworks into several passenger compartments with columns; upper and lower parts and both sides of columns are reinforced by oblique struts in a luggage compartment and the space underneath seats; arc frameworks in transverse framework of the passenger cabin are reinforced with the oblique struts at the identical position of an arc wall on two sides of the fuselage; the average projection length of the oblique struts in each passenger compartments is ⅓ the span of the passenger compartments; an interspacing of the transverse frameworks of the passenger cabin is arranged to be the same as that of the seats along the longitudinal direction of the passenger cabin; and all rows of seats in the passenger cabin are aligned with the transverse frameworks of the passenger cabin, and mounted longitudinally in the center by passing across the corresponding oblique struts.

3. The large amphibious aircraft without airstairs of claim 1, wherein one big and one small hydraulic cylinder is fixed on a top casing of the stationary gearbox; a piston of the big hydraulic cylinder is connected to the top of the moveable gearbox; piston of the small hydraulic cylinder is connected to the top of a steering sleeve; two bolts of the steering sleeve are encased in one upper loose bevel gear and one lower loose bevel gear, of which each of upper and lower loose bevel gears meshes with a respective bevel gear at all times; a shaft of the bevel gear runs across the stationary gearbox and the fuselage framework and is connected with the one or more engines by coupling; the two loose bevel gears and four plates of the steering sleeve are passed through in the center by a hexagonal shaft of the moveable gearbox; and the hexagonal shaft further runs across the upper and lower casing of the stationary gearbox straight through a hole on a top surface of the fuselage.

4. The large amphibious aircraft without airstairs of claim 3, wherein the two bevel gears in moveable gearbox are vertically connected; wherein the shaft of the vertically mounted bevel gear extends from the moveable gearbox and connects with the one or more vertical lift propeller devices; the hexagonal shaft above one of the bevel gears runs across the casing of the stationary gearbox and the hexagonal holes at the centers of the upper and lower loose bevel gears; and the top surface of the moveable gearbox is connected with the piston of the big hydraulic cylinder.

* * * * *